United States Patent
Kodachi et al.

(10) Patent No.: US 11,158,461 B2
(45) Date of Patent: Oct. 26, 2021

(54) CAPACITOR

(71) Applicant: MEIDENSHA CORPORATION, Tokyo (JP)

(72) Inventors: Keiichi Kodachi, Numazu (JP); Yuka Yamamoto, Numazu (JP); Kuan Chung Tey, Numazu (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/274,508

(22) PCT Filed: May 22, 2019

(86) PCT No.: PCT/JP2019/020236
§ 371 (c)(1),
(2) Date: Mar. 9, 2021

(87) PCT Pub. No.: WO2020/066123
PCT Pub. Date: Apr. 2, 2020

(65) Prior Publication Data
US 2021/0249191 A1   Aug. 12, 2021

(30) Foreign Application Priority Data

Sep. 28, 2018 (JP) .............................. JP2018-183872
Feb. 26, 2019 (JP) .............................. JP2019-032232

(51) Int. Cl.
*H01G 4/258* (2006.01)
*H01G 4/40* (2006.01)
(Continued)

(52) U.S. Cl.
CPC .............. *H01G 4/258* (2013.01); *H01G 2/08* (2013.01); *H01G 4/224* (2013.01); *H01G 4/40* (2013.01)

(58) Field of Classification Search
CPC ........... H01G 2/10; H01G 2/08; H01G 4/224; H01G 9/06; H01G 9/08; H01G 11/78
See application file for complete search history.

(56) References Cited

U.S. PATENT DOCUMENTS

2010/0285346 A1   11/2010   Graban et al.
2012/0040227 A1   2/2012   Jeong et al.
(Continued)

FOREIGN PATENT DOCUMENTS

CN    203150389 U    8/2013
EP    2 555 408 A1   2/2013
(Continued)

OTHER PUBLICATIONS

Chinese Office Action, Application No. 201980060151.7, dated Jul. 15, 2021, 8 pages.
(Continued)

*Primary Examiner* — Eric W Thomas
(74) *Attorney, Agent, or Firm* — Foley & Lardner LLP

(57) ABSTRACT

A box-shaped inner case (3) is accommodated in a box-shaped outer case (2), and refrigerant flow passages (27) are formed at five surfaces except opening surfaces (14, 24) by gaps between the inner and outer cases. A Gap of an opening edge of the outer case (2) and an opening edge of the inner case (3) is covered with a frame-shaped cover (6), A capacitor element (4) formed from a film capacitor is placed in the inner case (3), and the inner case (3) is filled with potting material (5) having thermal conductivity so that the capacitor element (4) except the terminals (4a, 4b) is embedded. Cooling water flows along a longitudinal direction of the outer case (2) with one of refrigerant pipe connecters (15) being a refrigerant inlet and the other of the refrigerant pipe connecters (15) being a refrigerant outlet.

10 Claims, 11 Drawing Sheets

(51) Int. Cl.
    *H01G 2/08*         (2006.01)
    *H01G 4/224*       (2006.01)

(56) References Cited

U.S. PATENT DOCUMENTS

| | | |
|---|---|---|
| 2015/0245535 A1 | 8/2015 | Fujita et al. |
| 2016/0314903 A1* | 10/2016 | Danov .................. H01G 4/005 |

FOREIGN PATENT DOCUMENTS

| | | |
|---|---|---|
| JP | 2003-249703 A | 9/2003 |
| JP | 2006-210561 A | 8/2006 |
| JP | 2012-43767 A | 3/2012 |
| JP | 2013-255424 A | 12/2013 |
| JP | 2015-023664 A | 2/2015 |
| JP | 2017-103921 A | 6/2017 |
| WO | WO 2014/061447 A1 | 4/2014 |

OTHER PUBLICATIONS

Extended European Search Report, Application No. 19864668.9, dated Sep. 14, 2021, 10 pages.

* cited by examiner

CAPACITOR

TECHNICAL FIELD

The present invention relates to a capacitor used for a power conversion device etc., and more particularly to a capacitor having a cooling mechanism.

BACKGROUND ART

As one of components forming a power conversion device such as an inverter, a capacitor is used. Although, for size reduction of the power conversion device, there is a need to reduce sizes of the components forming the power conversion device, in order to reduce a size of the capacitor as a typical component forming the power conversion device, it is necessary to efficiently cool the capacitor that is a component having relatively low heat resistance. Especially in a case where temperature (ambient temperature) of a surrounding atmosphere exceeds heat resistant temperature of the capacitor in an environment in which the capacitor is used, some active cooling is needed.

Patent Document 1 discloses an inverter device in which a cooling water flow passage is formed inside a wall portion of a housing and a capacitor, elements of which are sealed in resin in a case, is mounted on the wall portion. In this inverter device, a bottom surface of the case of the capacitor is in contact with a surface of the wall portion, and is cooled by cooling water that flows in the cooling water flow passage formed inside the wall portion.

Patent Document 2 discloses a structure in which as a capacitor module of a power conversion device, a capacitor element is placed in a box-shaped capacitor case and resin material is made to flow in the capacitor case, then the capacitor element is embedded in a resin portion. A cooling pipe penetrates the resin portion, and the capacitor element is cooled by cooling water that flows in this cooling pipe.

In a case of a structure of Patent Document 1, since the case of the capacitor and the wall portion provided with the cooling water flow passage are different members, thermal resistances in heat transfer paths between the capacitor elements and the cooling water are large. Further, the capacitor is cooled from only one side. Consequently, cooling performance is low. In addition, since surfaces and portions except the surface that is in contact with the wall portion provided with the cooling water flow passage are exposed to temperature (ambient temperature) of a surrounding atmosphere, sufficient cooling cannot be expected when the ambient temperature is high.

In a case of the structure of Patent Document 2, although the metal cooling pipe is arranged with the metal cooling pipe passing through the capacitor case, in order to secure an insulation distance between the capacitor element and the cooling pipe, there are restrictions on position of the cooling pipe. Therefore, a size of the capacitor case is increased. Further, sufficient recovery of heat at a portion separated from the cooling pipe cannot be performed, and the whole cooling is not possible. As a consequence, when temperature (ambient temperature) of a surrounding atmosphere is high, the capacitor element is locally subject to heat at a portion separated from the cooling pipe.

CITATION LIST

Patent Document

Patent Document 1: Japanese Unexamined Patent Application Publication No. 2015-023664
Patent Document 2: Japanese Unexamined Patent Application Publication No. 2017-103921

SUMMARY OF THE INVENTION

A capacitor according to the present invention comprises: a box-shaped inner case whose one side surface is an opening surface; an outer case enclosing outer sides of surfaces except the opening surface of the inner case, forming gaps that serve as refrigerant flow passages between the inner case and the outer case and provided with a refrigerant inlet and a refrigerant outlet; a capacitor element placed in the inner case through the opening surface, terminals of the capacitor element being arranged at the opening surface; and a thermal conductive potting material filling the inner case so that the capacitor element except the terminals is embedded.

In this configuration, a refrigerant flowing into the outer case from the refrigerant inlet flows in the capacitor through the refrigerant flow passages that enclose all the surfaces except the opening surface where the terminals are arranged. With this, a periphery of the capacitor element is enclosed by the refrigerant flow passages, then the capacitor element is effectively cooled. Since the thermal conductive potting material is in absolute contact with the capacitor element and inner wall surfaces of the inner case and heat is surely transferred to the refrigerant through the inner case, the heat is effectively recovered.

When temperature (ambient temperature) of a surrounding atmosphere is high, since the outer case that is subject to heat from the surrounding atmosphere and the inner case are thermally insulated from each other by a refrigerant flowing in the refrigerant flow passages, heat transfer to the capacitor element is suppressed. In particular, the refrigerant flow passages are formed so as to enclose almost the whole of the capacitor element except for the opening surface where the terminals are arranged. This prevents a part of the capacitor element from being locally high temperature when the ambient temperature of the surrounding atmosphere is high.

As the refrigerant, for instance, a liquid phase refrigerant such as cooling water containing water as a main component and cooling oil (e.g. mineral oil) having insulation property can be used. Further, a gaseous refrigerant or a gas-liquid mixture type refrigerant could be used.

As a preferable capacitor, the inner case and the outer case each have a rectangular parallelepiped box shape, one side surface, corresponding to the opening surface of the inner case, of the outer case is an opening surface, and the inner case can be installed in the outer case through the opening surface of the outer case, and the refrigerant inlet is provided at one end portion in a longitudinal direction of the outer case, and the refrigerant outlet is provided at the other end portion of the outer case.

Therefore, the refrigerant flows along a longitudinal direction of the inner and outer cases having the rectangular parallelepiped box shape, and a heat exchange is effectively performed. Further, five surfaces, except the opening surface where the terminals are arranged, out of six surfaces of the rectangular parallelepiped shape are enclosed with the refrigerant flow passages.

As one aspect of the present invention, the capacitor further comprises a frame-shaped cover fixed to the one side surface, serving as the opening surface, of the outer case and covering a gap between the opening surface of the outer case and the inner case. Although the opening surface of the outer case is so larger than the inner case that the inner case is able to be installed in the outer case, the frame-shaped cover covers the gap between the outer case and the inner case, then the refrigerant flow passages are hermetically sealed.

A cooling fin could be provided at least at a part of outside surfaces, which are in contact with the refrigerant flow passages, of the inner case. By this cooling fin, a heat exchange area becomes large.

Further, as one aspect of the present invention, the inner case is filled with insulating oil serving as the refrigerant without using the potting material.

That is, a capacitor comprises: a box-shaped inner case whose one side surface is an opening surface and which is filled with insulating oil serving as a refrigerant and has a communication hole through which the insulating oil can flow; an outer case enclosing outer sides of surfaces except the opening surface of the inner case, forming gaps that serve as refrigerant flow passages between the inner case and the outer case and provided with a refrigerant inlet and a refrigerant outlet; a capacitor element placed in the inner case through the opening surface, terminals of the capacitor element being arranged at the opening surface; and a lid member covering the opening surface with the terminals being led out.

In this configuration, the inner case is filled with the insulating oil through the communication hole. By and through this insulating oil, the capacitor is insulated, and also heat is transferred from the capacitor to the inner case. Then, the insulating oil flowing in the refrigerant flow passages between the inner case and the outer case cools the inner case, which in turn cools the capacitor. Here, as long as the refrigerant flow passages and an inside of the inner case communicate with each other through the communication hole such that the inside of the inner case is filled with the insulating oil, the insulating oil does not necessarily need to actively flow in the inner case.

Moreover, as one aspect of the present invention, another electronic component is attached to an outside surface of the outer case. The electronic component attached to the outside surface of the outer case then undergoes cooling by the refrigerant through the outer case.

As another aspect of the present invention, a discharge resistor connected to the capacitor element is placed in the inner case together with the capacitor element.

In this configuration, the discharge resistor that is a heat-generating component is effectively cooled by the flow of the refrigerant flowing around the discharge resistor together with the capacitor element. In addition, connection between the capacitor element and the discharge resistor is possible inside the inner case.

According to the capacitor of the present invention, all the surfaces except the opening surface, where the terminals are arranged, of the inner case accommodating therein the capacitor element is enclosed with the refrigerant flow passages, then the capacitor element is effectively cooled. In particular, since the potting material or the insulating oil fills the inner case and is in absolute contact with the inner wall surfaces of the inner case, heat is surely recovered by the refrigerant. Further, when the ambient temperature of the surrounding atmosphere is high, since the inner case is thermally insulated from the outer case by the refrigerant flowing in the refrigerant flow passages formed so as to enclose the capacitor element, partial or local high-temperature of the capacitor element is suppressed.

EMBODIMENTS FOR CARRYING OUT THE INVENTION

In the following description, embodiments of a capacitor 1 according to the present invention will be explained in detail with reference to the drawings.

Figure 1:
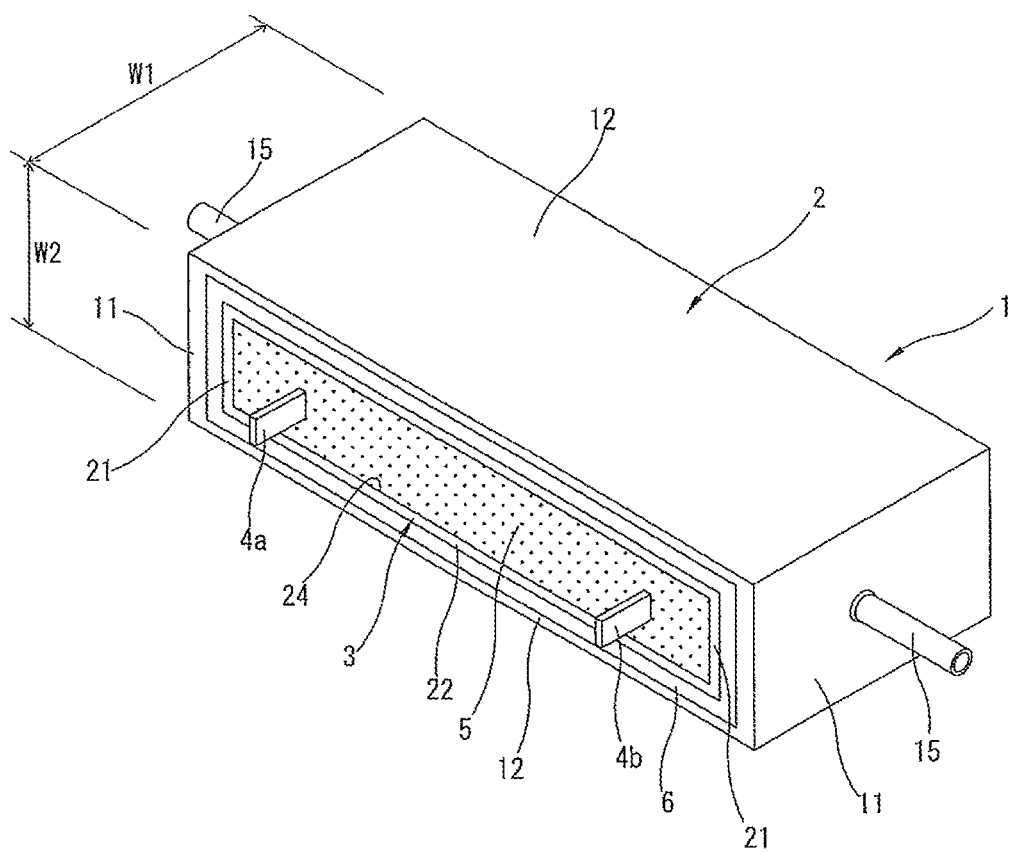
FIG. 1 is a perspective view showing a first embodiment of a capacitor.
Figure 2:
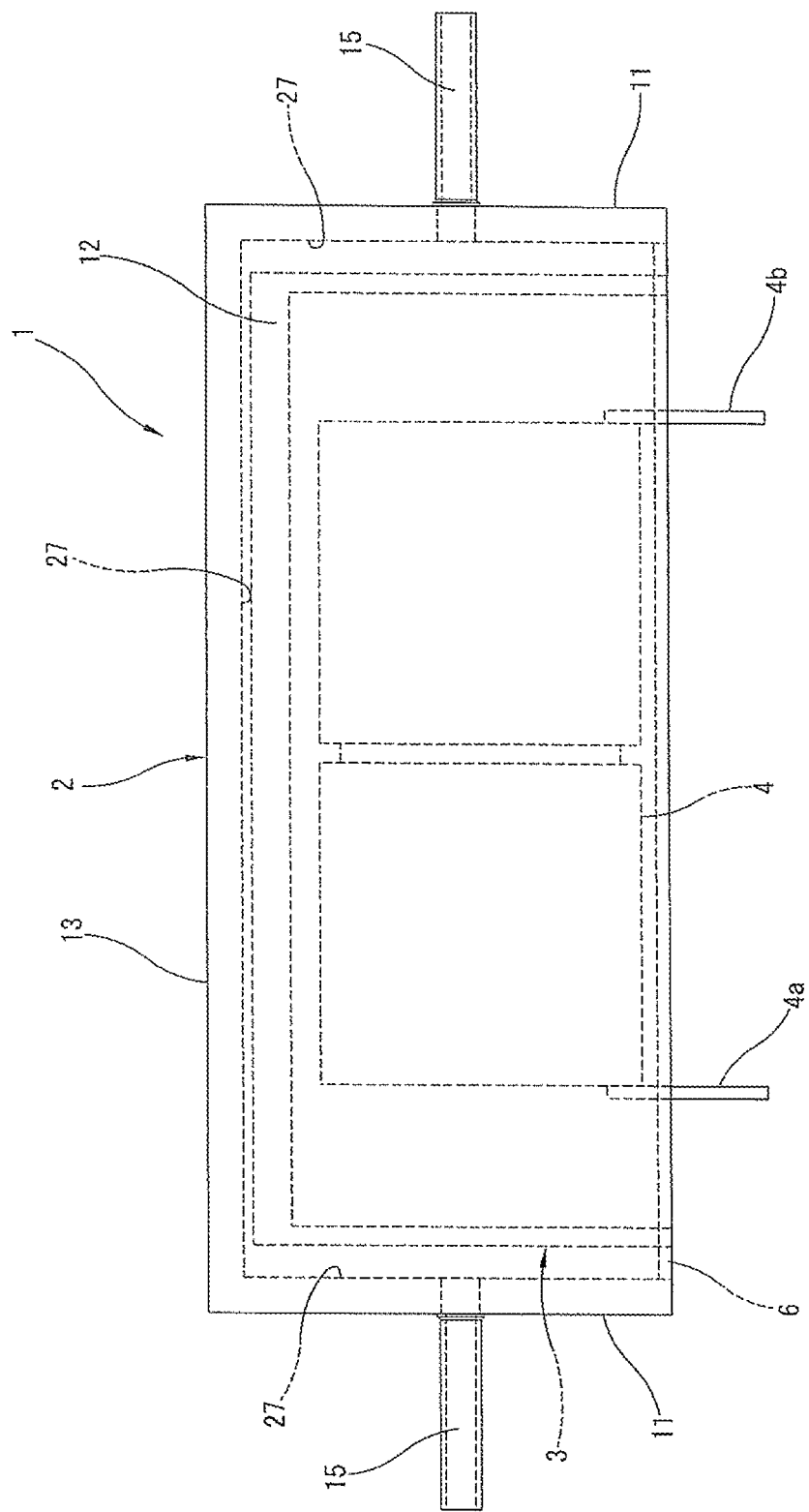
FIG. 2 is a plan view of the capacitor of the first embodiment.
Figure 3:
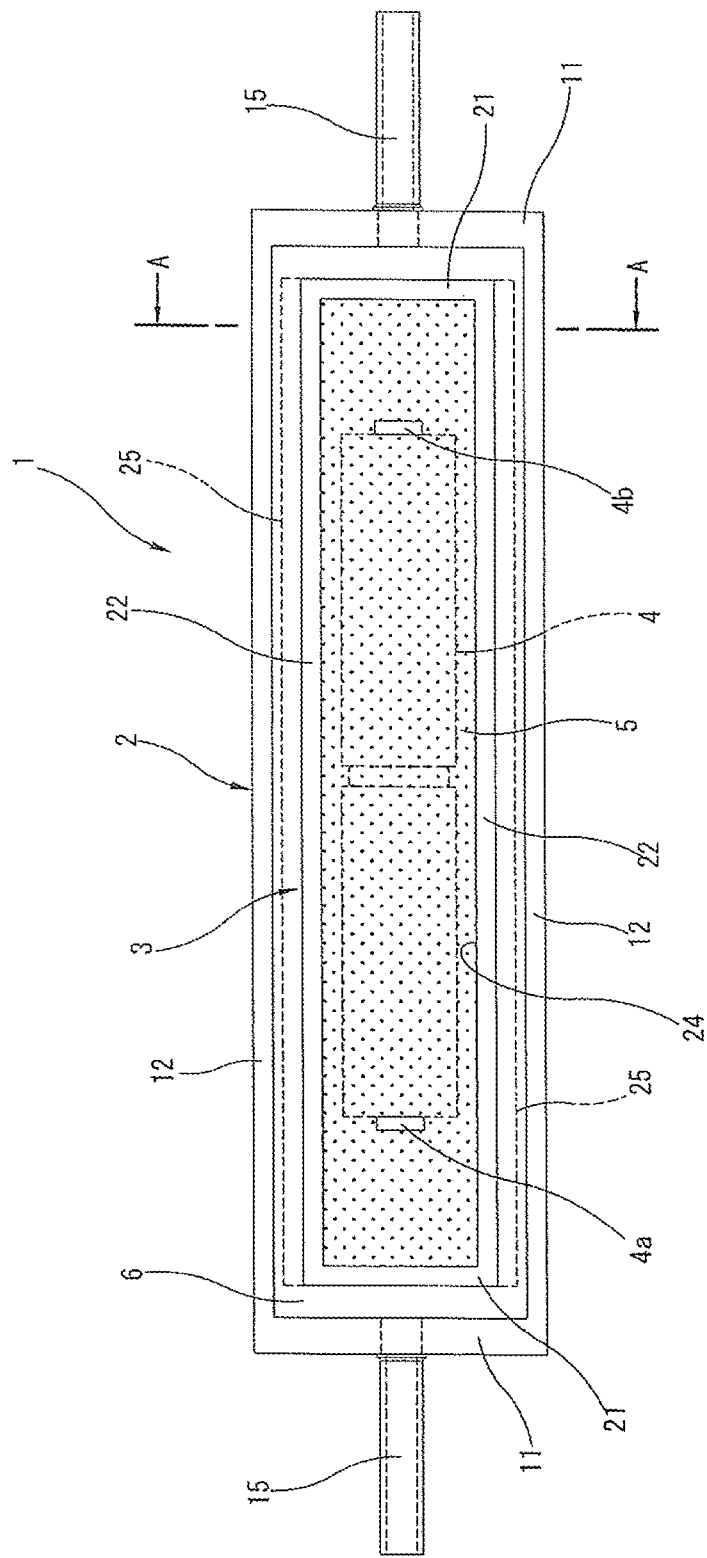
FIG. 3 is a front view of the capacitor of the first embodiment.
Figure 4:
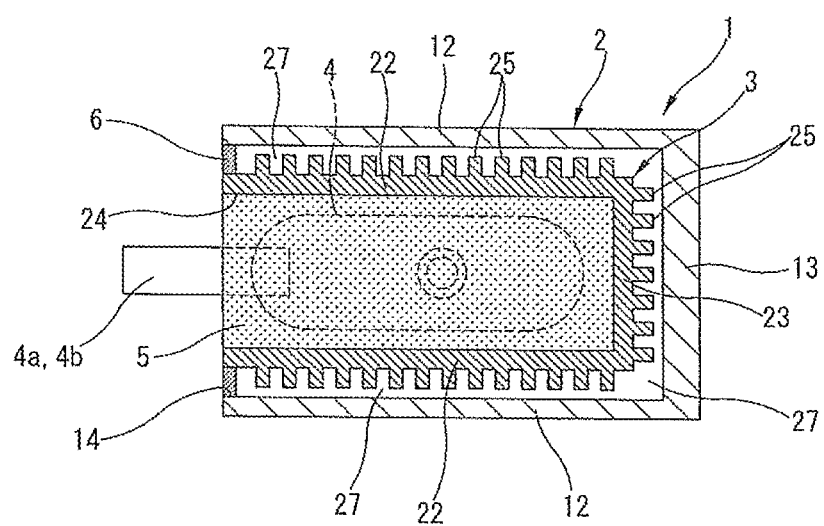
FIG. 4 is a sectional view taken along an A-A line of FIG. 3.
Figure 5:
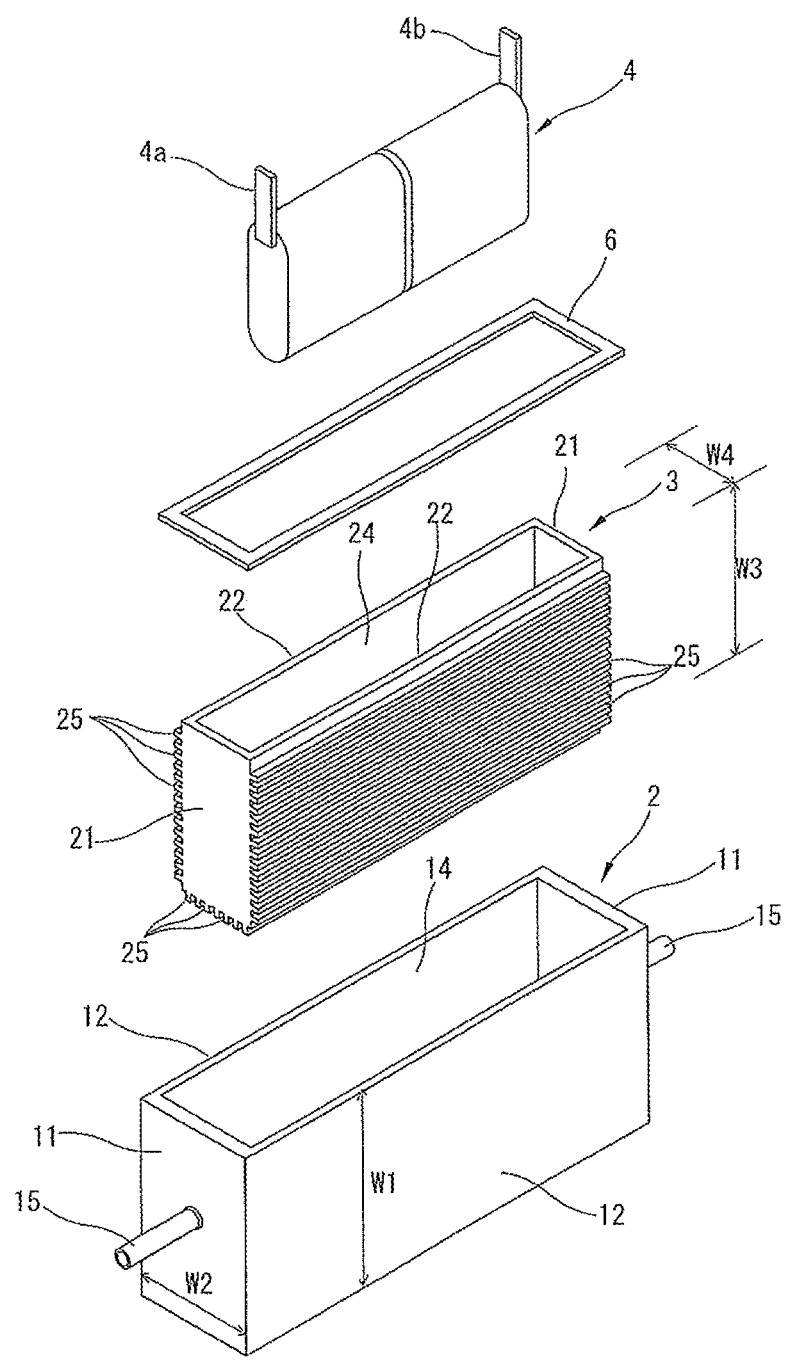
FIG. 5 is a perspective exploded view of the capacitor of the first embodiment.

FIG. 1 is a perspective view showing a first embodiment of the capacitor 1 used as a component forming an inverter for, for instance, an electric vehicle and a hybrid vehicle. FIG. 2 is a plan view of the capacitor 1 of the first embodiment. FIG. 3 is a front view of the capacitor 1 of the first embodiment. FIG. 4 is a sectional view taken along an A-A line of FIG. 3. The capacitor 1 has an outer case 2 having a rectangular parallelepiped shape, as shown in FIG. 4, an inner case 3 having a similar rectangular parallelepiped shape and accommodated in the outer case 2, a capacitor element 4 placed in the inner case 3 and potting material 5 filling the inner case 3 and cured so that the capacitor element 4 is embedded. FIG. 5 is a perspective exploded view showing the outer case 2, the inner case 3 and the capacitor element 4. For such capacitor 1 mounted in the vehicle, since the capacitor element 4 generates heat and also temperature (ambient temperature) of an atmosphere such as an engine room where the capacitor 1 is located can be relatively high (as an example, over 100° C.), forcible cooling using refrigerant is required. In the first embodiment, as the refrigerant, for instance, cooling water containing water as a main component is used.

The outer case 2 is made of metal, preferably metal that is excellent in heat conduction. The outer case 2 is formed as a single-piece case by, e.g. cutting or aluminum die casting of aluminum alloy base material. The outer case 2 has a box shape whose one side surface out of six surfaces forming the rectangular parallelepiped is open. That is, the outer case 2 has a pair of end walls 11 forming end surfaces of both ends in a longitudinal direction of the outer case 2, a pair of side walls 12 forming side surfaces each having a relatively wide width (W1), a bottom wall 13 forming a side surface having a relatively narrow width (W2) and an opening surface 14 corresponding to a side surface having the relatively narrow width (W2) and facing the bottom wall 13. Further, a rectangular frame-shaped cover 6 is fixed to the opening surface 14.

Refrigerant pipe connecters 15, one of which serves as a refrigerant inlet and the other of which serves as a refrigerant outlet, are connected to center portions of the pair of end walls 11. These refrigerant pipe connecters 15 each have a circular tubular shape extending along the longitudinal direction of the outer case 2, and are connected to a cooling water circulation system (not shown) including a pump (not shown).

In the same manner as the outer case 2, the inner case 3 is made of metal, preferably metal that is excellent in heat conduction. The inner case 3 is formed as a single-piece case by, e.g. cutting or aluminum die casting of aluminum alloy base material. The inner case 3 has the rectangular parallelepiped shape that is substantially a similar figure to the outer case 2 and smaller than the outer case 2. In the same manner as the outer case 2, the inner case 3 is formed into a box shape whose one side surface out of six surfaces forming the rectangular parallelepiped is open. That is, as shown in the perspective exploded view of FIG. 5, the inner case 3 has a pair of end walls 21 forming end surfaces of both ends in a longitudinal direction of the inner case 3, a pair of side walls 22 forming side surfaces each having a relatively wide width (W3), a bottom wall 23 forming a side surface having a relatively narrow width (W4) and an opening surface 24 corresponding to a side surface having the relatively narrow width (W4) and facing the bottom wall 23. A number of cooling fins 25 extending straight along the longitudinal direction of the inner case 3 are formed on surfaces of the pair of side walls 22 and the bottom wall 23. For instance, a number of cooling fins 25 are arranged on all surfaces of the side walls 22 and the bottom wall 23 at regular pitches.

The opening surface 24 of the inner case 3 is located at a surface corresponding to the opening surface 14 of the outer case 2. That is, in a state in which the outer case 2 and the inner case 3 are combined together, the opening surface 24 of the inner case 3 is positioned in the opening surface 14 of the outer case 2. Then, between the inner case 3 and the outer case 2 at the respective five surfaces except these opening surfaces 14 and 24, gaps serving as refrigerant flow passages 27 are formed. In other words, the outer case 2 encloses outer sides of the five surfaces except the opening surface 24 of the inner case 3, and the refrigerant flow passages 27 are formed at the respective surfaces. As shown in FIG. 4, although the cooling fins 25 of the inner case 3 protrude so as to approach inner wall surfaces of the outer case 2, top edges of the cooling fins 25 do not touch the inner wall surfaces of the outer case 2, and slight gaps exist so that the cooling water can flow through or across the cooling fins 25.

The frame-shaped cover 6 is provided between an opening edge of the outer case 2 and an opening edge of the inner case 3, and closes opening surfaces of the refrigerant flow passages 27 formed between them. For instance, as an example, the cover 6 is formed from a metal plate whose material is same as those of the outer case 2 and the inner case 3, and its outer peripheral edge is welded (or brazed) to the opening edge of the outer case 2 and its inner peripheral edge is welded (or brazed) to the opening edge of the inner case 3. With this structure, the refrigerant flow passages 27 are hermetically sealed, and the outer case 2 and the inner case 3 are firmly integrated. Alternatively, the cover 6 could be fixed to the outer case 2 and the inner case 3 with screws etc., and their mating surfaces could be sealed with sealant such as a liquid gasket. Alternatively, a portion corresponding to the cover 6 may be formed integrally with the inner case 3, and this portion may be welded (or brazed) or screwed to the opening edge of the outer case 2.

As shown in FIG. 5, the capacitor element 4 accommodated in the inner case 3 is formed from a winding film capacitor having a flat oval shape so as to correspond to a cross-sectional shape of the inner case 3. For instance, a film capacitor having a typical structure, in which a resin film such as polypropylene and polyethylene terephthalate is prepared as a dielectric, and metal leafs (metal sheet) or metal layers formed on respective resin films by coating are prepared as electrodes, then these dielectric and electrodes are wound into a flat roll, is used. In the illustrated example, two film capacitors are previously integrated with the two film capacitors arranged in a row, and its both ends are provided with terminals 4a and 4b. That is, the two terminals 4a and 4b are positioned apart from each other at both end portions in a longitudinal direction of the capacitor element 4 having a long narrow shape as a whole, and extend parallel to each other.

Here, for instance, the capacitor element 4 could be provided with a cylindrical metal case having a shape along an outer peripheral surface of the wound film. However, in the illustrated example, in order to improve heat radiation performance, the capacitor element 4 is provided with no case. That is, the film capacitor formed by winging the film etc. and fixing the terminals 4a and 4b is accommodated in the inner case 3 without being accommodated in the cylindrical case. It is noted that a winding canter axis of the film etc. of the film capacitor extends along the longitudinal direction of the inner case 3.

The capacitor element 4 is placed in the inner case 3 with the pair of terminals 4a and 4b protruding from the opening surface 24. Then, the inner case 3 is filled with the potting material 5 having thermal conductivity and insulation property so that the capacitor element 4 except the terminals 4a and 4b is embedded. This potting material 5 fills an almost entire volume of an inside of the inner case 3.

As the potting material 5, for instance, epoxy-based potting material etc., which is generally commercially available as potting material for a circuit board, can be used. This potting material 5 is in liquid form having proper fluidity when not cured, and the potting material 5 is cured by application of heat in a heating furnace after the potting material 5 is injected into the inner case 3 or the inner case 3 is filled with the potting material 5. As the potting material 5, two-liquid mixture type containing a main agent and a curing agent could be used.

Here, order of two steps of assembly of the cases 2 and 3 and filling of the potting materials is arbitrarily determined. That is, after assembling the outer case 2 and the inner case 3, the capacitor element 4 could be placed in the inner case 3 and the inner case 3 could be filled with the potting material 5. Alternatively, after placing the capacitor element 4 in the inner case 3 and filling the inner case 3 with the potting material 5, this inner case 3 and the outer case 2 could be assembled. In a case of the embodiment in which the outer case 2 and the inner case 3 are integrated by the cover 6 being welded or brazed, after integrating the outer case 2 and the inner case 3, insertion or installation of the capacitor element 4 and filling of the potting material 5 are carried out.

Figure 6A:
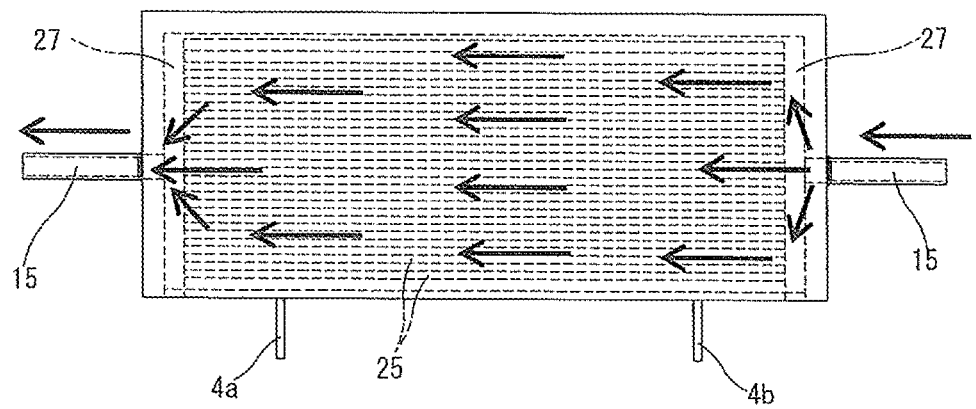
FIGS. 6A and 6B are explanatory drawings showing flows of cooling water, corresponding to the plan view and the front view respectively.
Figure 6B:
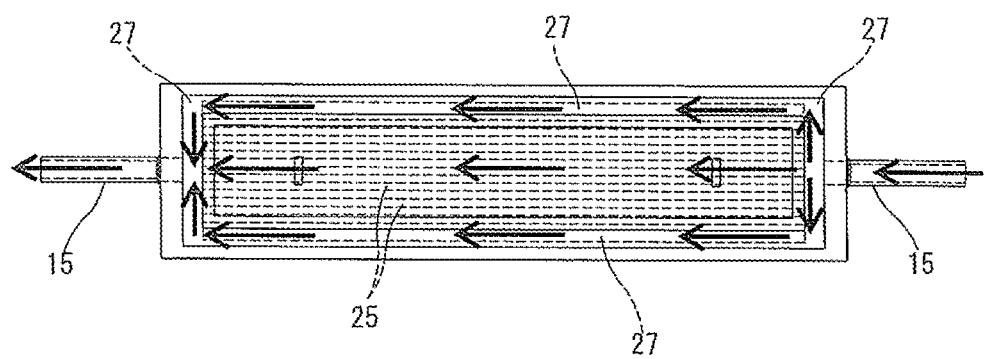

In the capacitor 1 structured as described above, one of the refrigerant pipe connecters 15 of the outer case 2 serves as the refrigerant inlet, and the other serves as the refrigerant outlet, then the cooling water forcibly flows by the pump (not shown). FIGS. 6A and 6B are explanatory drawings showing flows of the cooling water in the capacitor 1 by arrows. As shown in FIGS. 6A and 6B, the cooling water flowing into the capacitor 1 from the refrigerant inlet radially expands in the refrigerant flow passage 27 between the one end wall 11 of the outer case 2 and the one end wall 21 of the inner case 3. The cooling water further flows in the refrigerant flow passages 27 between the side walls 12 of the outer case 2 and the side walls 22 of the inner case 3 and between the bottom wall 13 of the outer case 2 and the bottom wall 23 of the inner case 3 along the longitudinal directions of these cases 2 and 3. Then, the cooling water flows in the refrigerant flow passage 27 between the other end wall 11 of the outer case 2 and the other end wall 21 of the inner case 3, and flows out of the capacitor 1 through the refrigerant outlet. That is, the cooling water flows along the respective five surfaces, except the opening surfaces 14 and 24 where the terminals 4a and 4b are arranged, of the cases 2 and 3, and effectively cools the capacitor element 4 and also the potting material 5 which are enclosed with these five surfaces. In particular, since the potting material 5 that is excellent in heat conduction is in absolute contact with surfaces of the capacitor element 4 and inner wall surfaces of the inner case 3 and heat is surely transferred to the cooling water through the inner case 3, the heat is effectively recovered. Further, the inner case 3 is provided with the cooling fins 25, and thus a heat exchange area between the inner, case 3 and the cooling water becomes large, thereby improving heat transfer from the inner case 3 to the cooling water.

Here, the potting material 5 contributes to not only the heat conduction but also insulation of the capacitor element 4 and the inner case 3. In other words, the thermal conductivity is improved while insulating the capacitor element 4 and the inner case 3 from each other by the potting material 5. As mentioned above, the capacitor element 4 formed from the film capacitor has no cylindrical case, and is accommodated in the inner case 3 as it is, then insulated and protected by the potting material 5. Therefore, intermediate members that result in thermal resistances to the cooling water are reduced to a minimum, and heat of the capacitor element 4 formed from the film capacitor, which has a problem with heat resistance, is effectively recovered by the cooling water.

On the other hand, in a case where temperature (ambient temperature) of an atmosphere such as an engine room where the capacitor 1 is located becomes high, e.g. about 100° C., the outer case 2 is subject to heat by the ambient temperature. However, against such ambient temperature, almost the whole of the capacitor element 4 is enclosed with the refrigerant flow passages 27 and the outer case 2. Therefore, thermal influence on the capacitor element 4 by the ambient temperature is reduced. Further, even if temperature of the outer case 2 becomes high by the ambient temperature of the atmosphere, the outer case 2 and the inner case 3 are substantially thermally insulated from each other by the refrigerant flow passages 27, thereby maintaining temperature of the inner case 3 at low temperature, which in turn maintaining temperature of the capacitor element 4 at low temperature. In particular, since the capacitor element 4 is enclosed with the refrigerant flow passages 27 at five surfaces except the opening surfaces 14 and 24, the whole of the capacitor element 4 is thermally protected. This prevents the capacitor element 4 from being locally high temperature due to the ambient temperature of the atmosphere. That is, although there is a concern that the film capacitor having the problem with heat resistance will suffer thermal damage even partly when the ambient temperature exceeds heat resistant temperature of the film capacitor, the above configuration or structure can effectively suppress such partial or local high-temperature.

Here, in the embodiment, since the side surfaces each having the relatively narrow width, out of respective four side surfaces extending along the longitudinal direction of the rectangular parallelepiped shapes of the cases 2 and 3, are the opening surfaces 14 and 24, an area of a portion having no refrigerant flow passage 27 becomes the minimum. In other words, an area of a surface covered with the refrigerant flow passages 27 is increased to the maximum, and the capacitor element 4 is effectively cooled. Then, for the capacitor 1 for the vehicle, even though the ambient temperature of the atmosphere becomes high, since the cooling water flows in a wide area, the capacitor element 4 is maintained at lower temperature. In addition, since areas of the opening surfaces 14 and 24 having no refrigerant flow passage 27 are small, an amount of heat provided to the capacitor element 4 through the opening surfaces 14 and 24 is decreased.

In the illustrated example, the cooling fins 25 are provided on the three surfaces of the side walls 22 and the bottom wall 23 of the inner case 3 which are outside surfaces of the inner case 3. However, the cooling fins 25 could be provided on one or two surfaces. Alternatively, by taking account of balance between pressure loss and flow amount and/or reduction in machining cost, a structure having no cooling fin 25 could be possible.

Further, in the illustrated example, the refrigerant pipe connecters 15, one of which serves as the refrigerant inlet and the other of which serves as the refrigerant outlet, are fixed to the respective middle portions of the end walls 11 of the outer case 2. However, as long as the refrigerant inlet and the refrigerant outlet communicate with the respective refrigerant flow passages 27 (i.e. the refrigerant flow passages 27 at the both end portions in the longitudinal direction) formed between the end walls 11 of the outer case 2 and the end walls 21 of the inner case 3, other structures could be employed. For instance, in order to avoid interference between the refrigerant pipe connecters 15 and other components, refrigerant pipe connecters 15 that extend parallel to the surfaces of the end walls 11 may be connected to respective end portions of the side walls 12 or the bottom wall 13 of the outer case 2 (more specifically, to areas located at outer sides with respect to outside surfaces of the terminals 4a and 4b in the longitudinal direction of the outer case 2).

Figure 7:
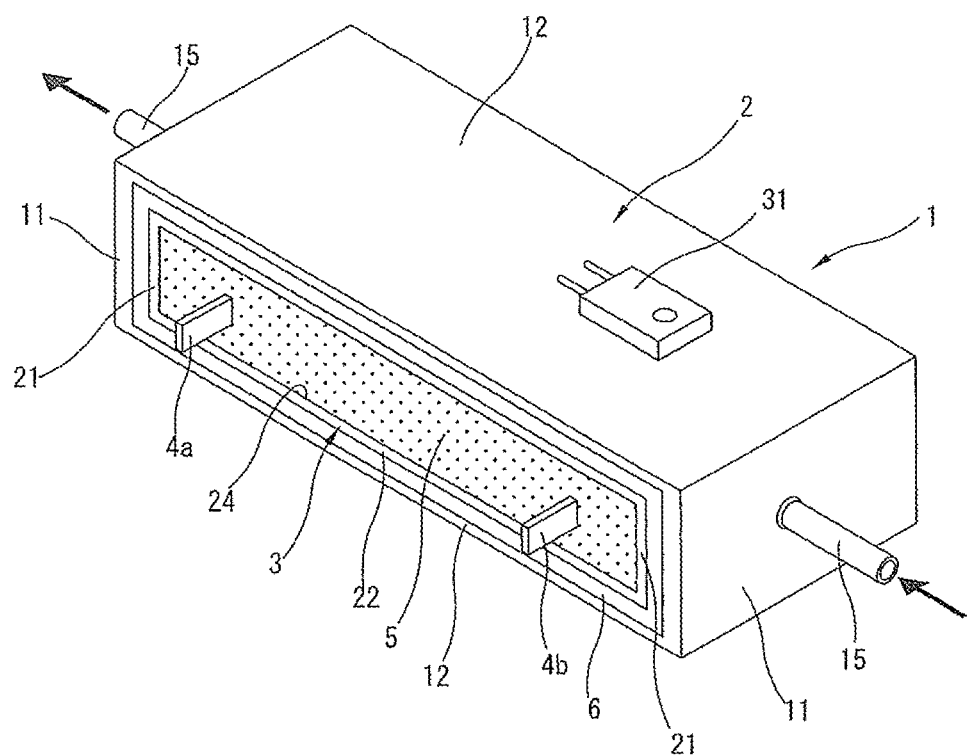
FIG. 7 is a perspective view showing a second embodiment in which a discharge resistor is attached to an outer case.

Next, FIG. 7 shows a second embodiment of the capacitor 1. In this second embodiment, a relatively small-sized other electronic component 31, which is preferably cooled, is attached to the outside surface of the outer case 2. As the electronic component 31, it could be a heat-generating component such as a resistor, or may be a certain electronic component which in itself does not generate much heat, but has relatively low heat resistance then needs cooling against temperature (ambient temperature) of the atmosphere. For instance, a discharge resistor 31 used in combination with the capacitor 1 for discharging residual charge of capacitor 1 after stop of operation of the inverter is supported by or on the outer case 2. In the illustrated example, the electronic component, i.e. the discharge resistor 31, is attached to the side wall 12 where an area of the refrigerant flow passage 27 formed inside is the widest. The discharge resistor 31 is particularly arranged at a closer side to the refrigerant inlet where cooling water temperature is relatively low from among positions in the longitudinal direction of the outer case 2.

As described above, since the outer case 2 is made of metal such as aluminum alloy that is excellent in heat conduction, an exchange of heat between the cooling water and the discharge resistor 31 is possible through the outer case 2. The discharge resistor 31 disposed outside is then cooled by the flow of the cooling water, besides the capacitor element 4 disposed inside. Especially in such a use environment that temperature (ambient temperature) of the surrounding atmosphere reaches, e.g. as much as 100° C., since the cooling water temperature is lower than the temperature (ambient temperature) of the atmosphere, the discharge resistor 31 can be cooled by the cooling water at the same time. This therefore eliminates the need for a cooler for the discharge resistor 31 that is the heat-generating component, and size reduction of the whole system of the inverter mounted in the vehicle can be achieved. Although FIG. 7 illustrates one electronic component 31 (one discharge resistor), a plurality of electronic components 31 can be attached to the outer case 2 if necessary.

Here, in a case where the outer case 2 is used as a kind of cooling plate as shown in the second embodiment illustrated in FIG. 7, it is preferable for the outer case 2 to be made of material that is excellent in heat conduction, whereas in the other cases, the outer case 2 is not necessarily a member that is excellent in heat conduction. Therefore, the outer case 2 could be made of, e.g. hard synthetic resin. Alternatively, for instance, by applying a heat-insulating coating to the outside surface of the metal outer case 2, heat insulation property of the outer case 2 against the ambient temperature could be increased.

Figure 8:
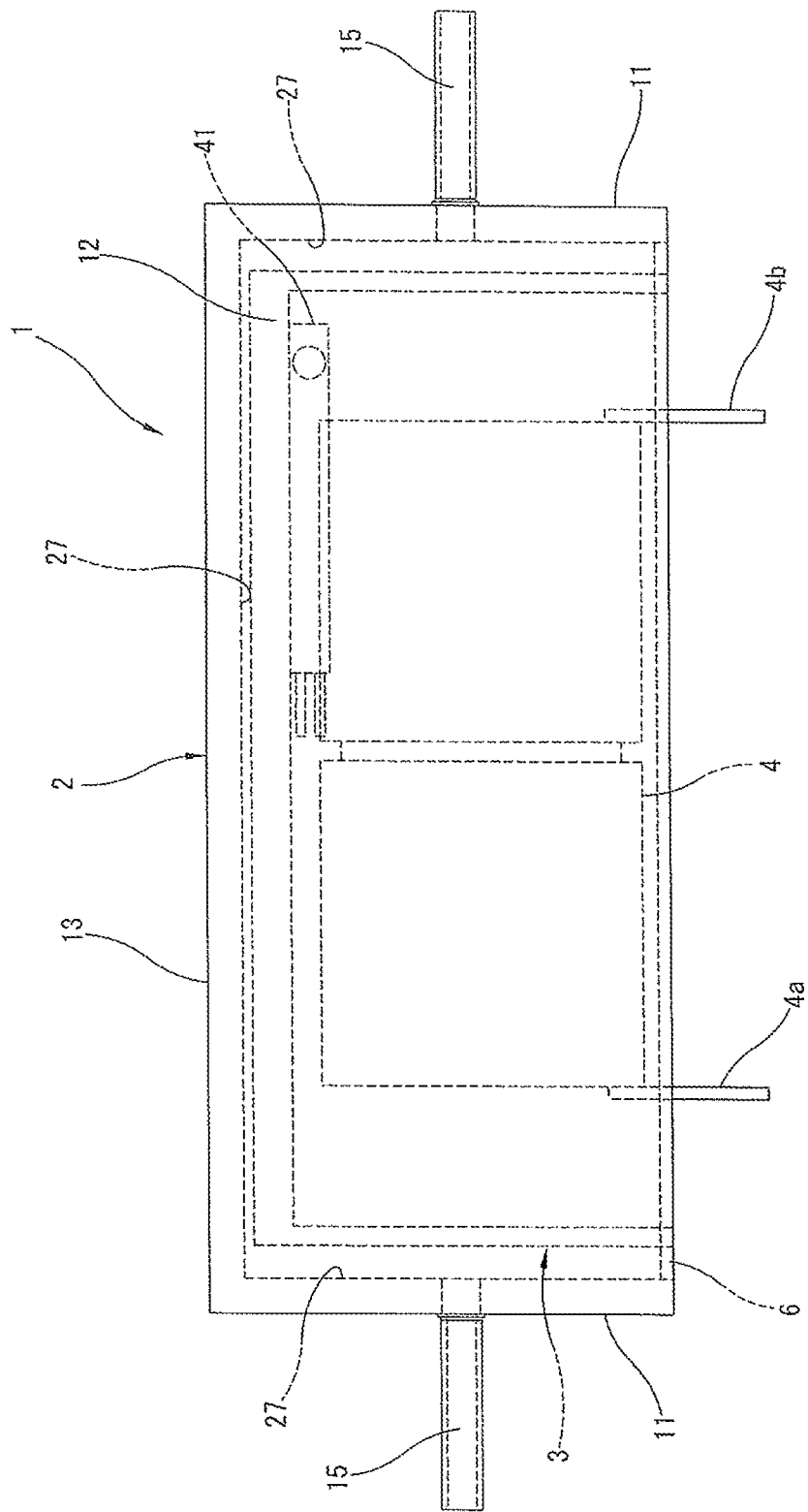
FIG. 8 is a plan view of the capacitor of a third embodiment in which a discharge resistor is accommodated in an inner case.
Figure 9:
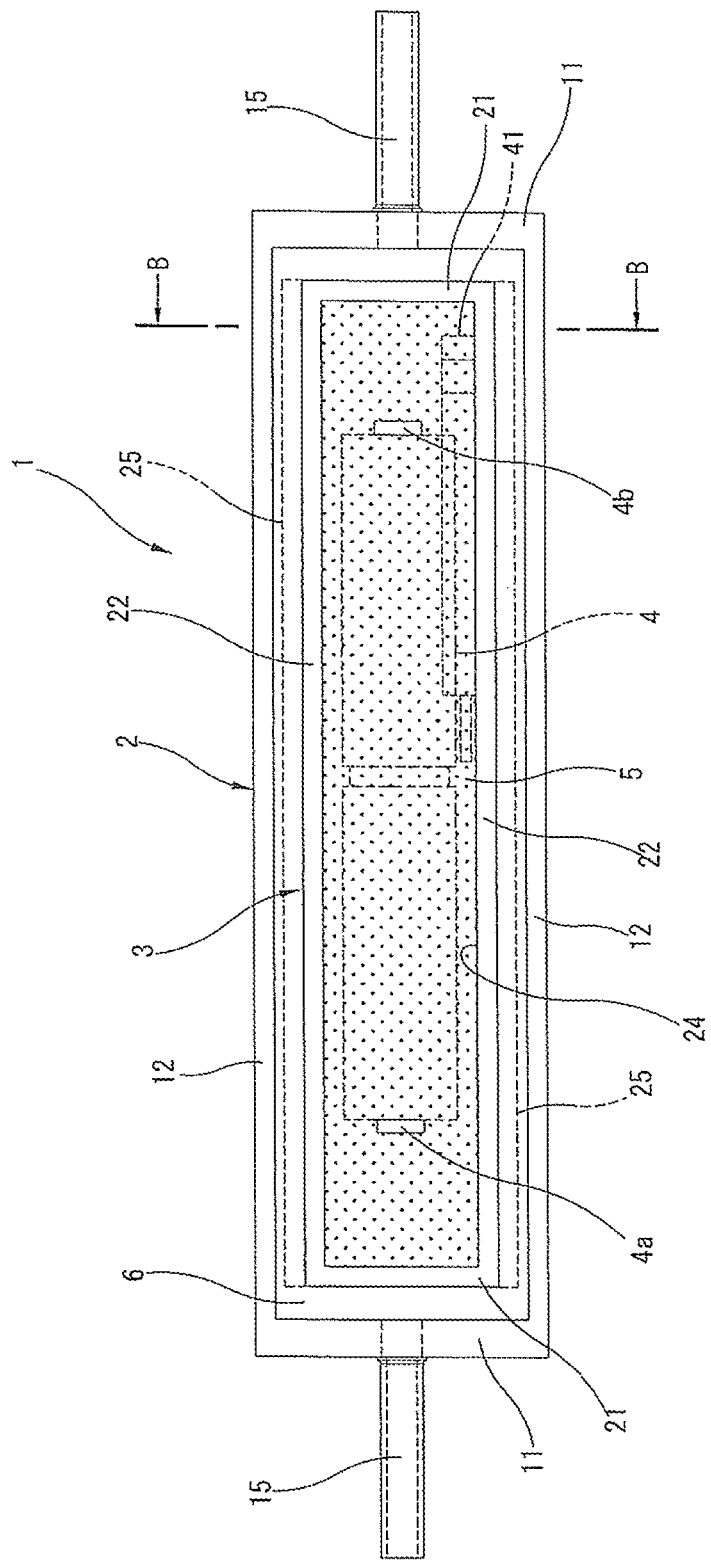
FIG. 9 is a front view of the capacitor of the third embodiment.
Figure 10:
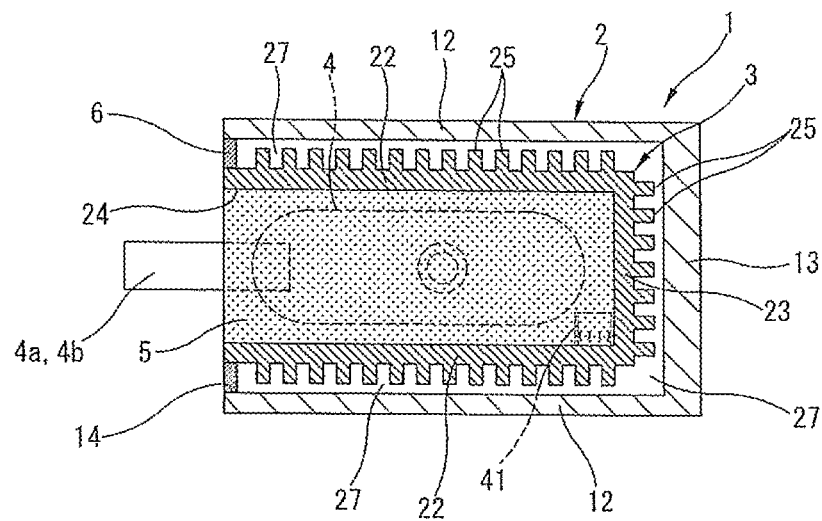
FIG. 10 is a sectional view taken along a B-B line of FIG. 9.

Next, FIGS. 8 to 10 show a third embodiment of the capacitor 1, in which a discharge resistor 41 is accommodated in the outer case 2. That is, the discharge resistor 41 is previously connected to the capacitor element 4 through wiring (not shown), and placed in the inner case 3 together with the capacitor element 4. Then, as described above, the inner case 3 is filled with the potting material 5 having thermal conductivity and insulation property, and the discharge resistor 41 is embedded in the potting material 5.

In the illustrated example, the discharge resistor 41 is formed into a long narrow prismatic shape (or a long narrow rectangular-column shape), and arranged inside the inner case 3 at a corner portion at which the one side wall 22 and the bottom wall 23 of the inner case 3 intersect so as to be in contact with these side wall 22 and bottom wall 23. That is, as shown in FIG. 10, since the capacitor element 4 has the wound oval shape, when accommodating the capacitor element 4 in the inner case 3 whose cross-section is a quadrangle, a relatively large space (a space filled with the potting material 5) remains at the corner portion. The discharge resistor 41 is accommodated between the inner wall surfaces of the inner case 3 and the capacitor element 4 using this space of the corner portion. Therefore, the discharge resistor 41 is integrated without increasing sizes of the inner case 3 and the outer case 2.

In this configuration or structure, the discharge resistor 41 that is a heat-generating component and also the capacitor element 4 are effectively cooled by the cooling water flowing in the refrigerant flow passages 27. This therefore eliminates the need for a cooler for the discharge resistor 41, and size reduction of the whole system of the inverter mounted in the vehicle can be achieved. Further, because of an integrated structure in which the discharge resistor 41 is embedded, there are advantages in layout of the inverter system and simplification of wiring.

Next, a fourth embodiment of the capacitor 1 will be explained. Since a basic configuration or structure of the capacitor 1 of the fourth embodiment is the same as that of the capacitor 1 of the first embodiment, drawing(s) is omitted here. In the fourth embodiment, as the refrigerant flowing in the refrigerant flow passages 27, cooling oil having insulation property, namely, insulating oil, is used. For instance, insulating oil containing mineral oil as a main component is used. The insulating oil forcibly flows in the refrigerant flow passages 27 between the outer case 2 and the inner case 3 by an oil pump.

According to a configuration using such insulating oil as the refrigerant, as compared with a case where the cooling water containing water as a main component is used, oil is superior to water in heat conduction. Therefore, a cooling effect on the capacitor element 4 is higher. Further, in the case where the outer case 2 and the inner case 3 are made of metal, corrosion of a contact surface with the refrigerant hardly occurs.

Figure 11:
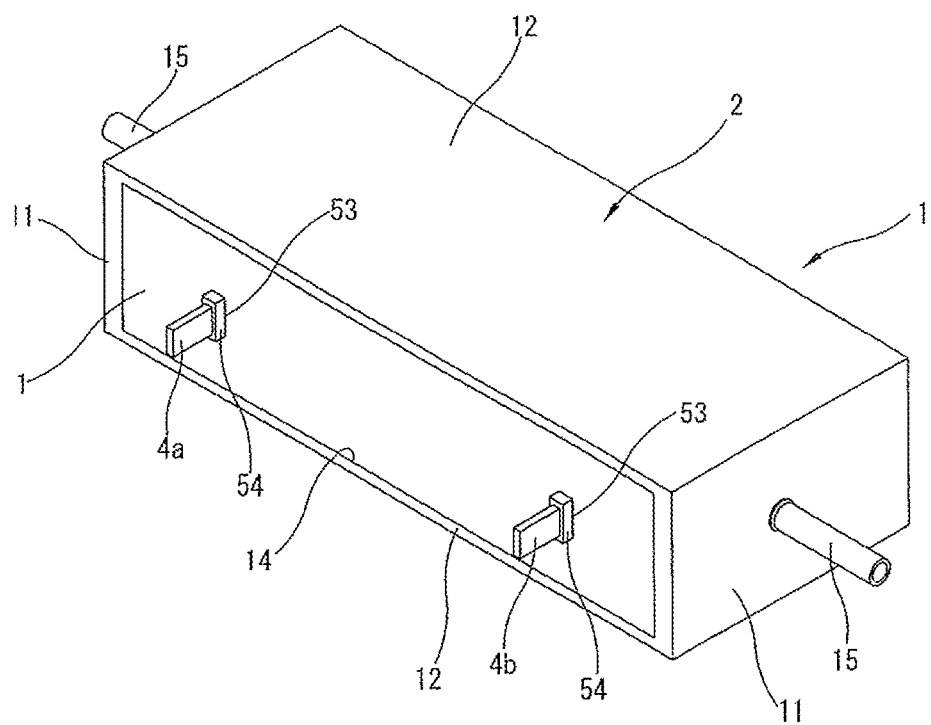
FIG. 11 is a perspective view showing a fifth embodiment of the capacitor.
Figure 12:
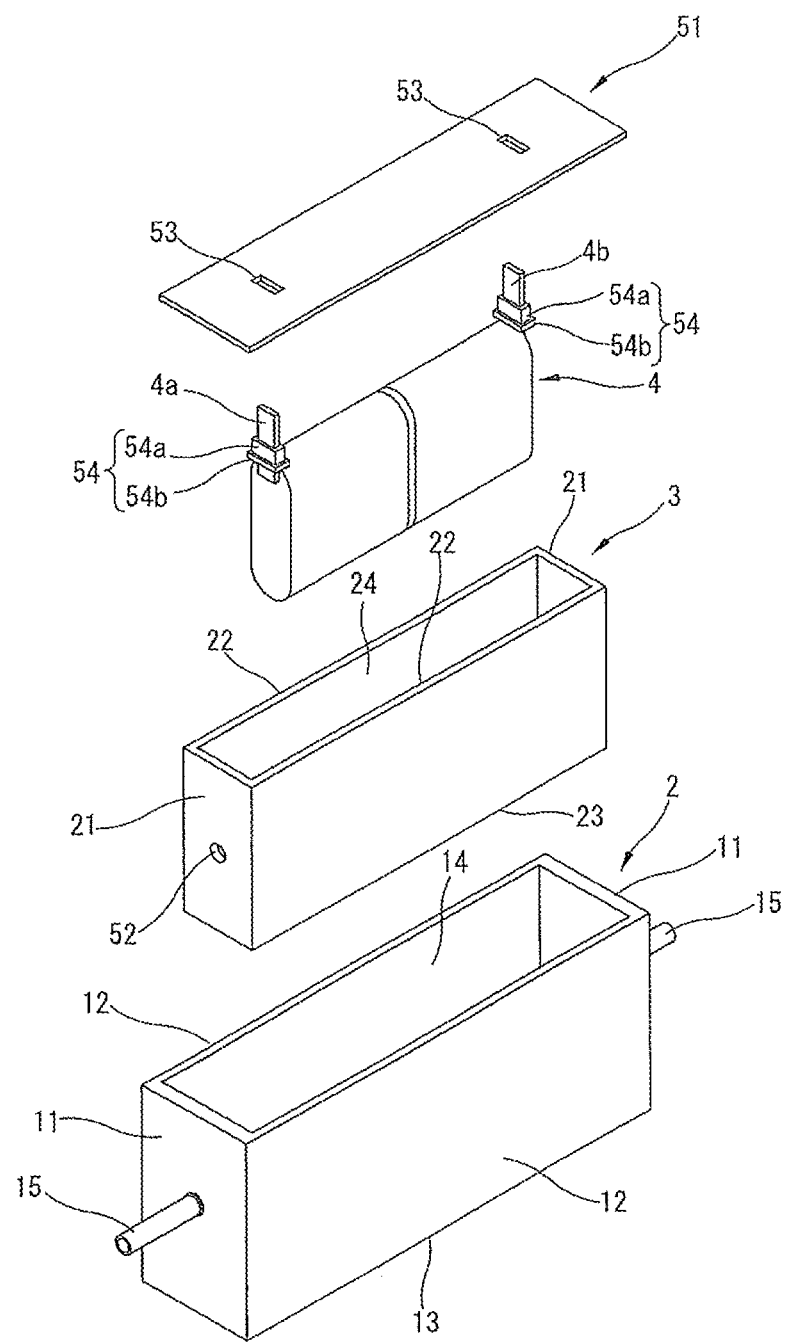
FIG. 12 is a perspective exploded view of the capacitor of the fifth embodiment.

Next, a fifth embodiment of the capacitor 1 will be explained with reference to FIGS. 11 and 12. In this fifth embodiment, instead of the above potting material 5 of the first embodiment etc., an inside of the inner case 3 is filled with the insulating oil serving as the refrigerant. That is, in the same manner as the above embodiments, the capacitor 1 has the outer case 2 having a rectangular parallelepiped shape, the inner case 3 having a similar rectangular parallelepiped shape and accommodated in the outer case 2 and the capacitor element 4 placed in the inner case 3. Further, instead of the frame-shaped cover 6, a rectangular plate-shaped lid member 51 is provided.

The outer case 2 is made of metal, preferably metal that is excellent in heat conduction. The outer case 2 is formed as a single-piece case by, e.g. cutting or aluminum die casting of aluminum alloy base material. The outer case 2 has a box shape whose one side surface out of six surfaces forming the rectangular parallelepiped is open. That is, the outer case 2 has the pair of end walls 11 forming end surfaces of both ends in a longitudinal direction of the outer case 2, the pair of side walls 12 forming side surfaces each having a relatively wide width, the bottom wall 13 forming a side surface having a relatively narrow width and the opening surface 14 corresponding to a side surface having the relatively narrow width and facing the bottom wall 13. Further, the lid member 51 is fixed to the opening surface 14.

The refrigerant pipe connecters 15, one of which serves as the refrigerant inlet and the other of which serves as the refrigerant outlet, are connected to center portions of the pair of end walls 11. These refrigerant pipe connecters 15 each have a circular tubular shape extending along the longitudinal direction of the outer case 2, and are connected to an insulating oil circulation system (not shown) including an oil pump (not shown).

In the same manner as the outer case 2, the inner case 3 is made of metal, preferably metal that is excellent in heat conduction. The inner: case 3 is formed as a single-piece case by, e.g. cutting or aluminum die casting of aluminum alloy base material. The inner case 3 has the rectangular parallelepiped shape that is substantially a similar figure to the outer case 2 and smaller than the outer case 2. In the same manner as the outer case 2, the inner case 3 is formed into a box shape whose one side surface out of six surfaces forming the rectangular parallelepiped is open. That is, the inner case 3 has the pair of end walls 21 forming end surfaces of both ends in a longitudinal direction of the inner case 3, the pair of side walls 22 forming side surfaces each having a relatively wide width, the bottom wall 23 forming a side surface having a relatively narrow width and the opening surface 24 corresponding to a side surface having the relatively narrow width and facing the bottom wall 23. Here, in the illustrated example, the cooling fins 25 as shown in the first embodiment are not provided. However, in the same manner as the first embodiment, the cooling fins 25 could be provided on the surfaces of the pair of side walls 22 and the bottom wall 23.

Each of the pair of end walls 21 is provided with a communication hole 52 through which the insulating oil can flow. The communication hole 52 is, for instance, a circular hole. Each communication hole 52 is formed at a substantially center position of the end wall 21.

The opening surface 24 of the inner case 3 is located at a surface corresponding to the opening surface 14 of the outer case 2. That is, in a state in which the outer case 2 and the inner case 3 are combined together, the opening surface 24 of the inner case 3 is positioned in the opening surface 14 of the outer case 2. Then, between the inner case 3 and the outer case 2 at the respective five surfaces except these opening surfaces 14 and 24, gaps serving as the refrigerant flow passages 27 are formed. In other words, the outer case 2 encloses outer sides of the five surfaces except the opening surface 24 of the inner case 3, and the refrigerant flow passages 27 are formed at the respective surfaces.

The lid member 51 is connected to the opening edge of the outer case 2 and the opening edge of the inner case 3 (e.g. by welding or brazing), and covers the opening surface 24 of the inner case 3 and also covers the opening surface 14 of the outer case 2, i.e. openings at upper ends of the refrigerant flow passages 27. For instance, as an example, the lid member 51 is formed from a metal plate whose material is same as those of the outer case 2 and the inner case 3. Then, after welding (or brazing) the lid member 51 to the opening edge of the inner case 3, the inner case 3 is installed or placed in the outer case 2, then finally, the opening edge of the outer case 2 and the lid member 51 are welded (or brazed). With this, the inside of the inner case 3 and also the refrigerant flow passages 27 are hermetically sealed, and the outer case 2 and the inner case 3 are firmly integrated.

The lid member 51 has a pair of terminal openings 53. These pair of terminal openings 53 are formed into, e.g. a rectangular shape.

In the same manner as the first embodiment etc., the capacitor element 4 accommodated in the inner case 3 is formed from a winding film capacitor having a flat oval shape so as to correspond to a cross-sectional shape of the inner case 3. For instance, a film capacitor having a typical structure, in which a resin film such as polypropylene and polyethylene terephthalate is prepared as a dielectric, and metal leafs (metal sheet) or metal layers formed on respective resin films by coating are prepared as electrodes, then these dielectric and electrodes are wound into a flat roll, is used. In the illustrated example, two film capacitors are previously integrated with the two film capacitors arranged in a row, and its both ends are provided with terminals 4a and 4b.

At base portions of the terminals 4a and 4b, seal caps 54 that are fitted to the terminal openings 53 of the lid member 51 are provided. The seal caps 54 are molded with rubber or synthetic resin material which have proper elasticity. The seal caps 54 each have a prism portion (or a rectangular-column portion) 54a that can be press-fitted into the terminal opening 53 and a flange portion 54b that is pressure-welded (or press-connected) to an inside surface of the second lid member 51. Here, the seal caps 54 could be molded with the terminals 4a and 4b being inserted, and after the molding, the terminals 4a and 4b could be inserted into the terminal openings 53. The seal caps 54 are tightly fixed to the terminal openings 53 of the lid member 51, then gaps between the terminals 4a and 4b led out by penetrating the lid member 51 and the lid member 51 are sealed.

In the capacitor 1 of the fifth embodiment structured as described above, one of the refrigerant pipe connecters 15 of the outer case 2 serves as the refrigerant inlet, and the other serves as the refrigerant outlet, then the insulating oil serving as the refrigerant forcibly flows by the pump (not shown). In the same manner as the flow explained in FIG. 6 in the first embodiment, the insulating oil flows in the refrigerant flow passages 27, and cools the inner case 3. Further, at the same time, the insulating oil flows into the inner case 3 through the pair of communication holes 52, and the inside of the inner case 3 in which the capacitor element 4 is accommodated is filled with the insulating oil. Since the insulating oil has insulation property and thermal conductivity, which is the same as the potting material 5 of the first embodiment, the insulating oil transfers or conducts heat of the capacitor element 4 to the inner case 3 while insulating the capacitor element 4. With this, the capacitor element 4 is effectively cooled. In addition, working and effects described in the first embodiment etc. can be obtained. Since the inside of the inner case 3 and the refrigerant flow passages 27 communicate with each other through the communication holes 52, the insulating oil flowing into the inner case 3 does not stay or remain, and thus does not deteriorate. Here, since the insulating oil filling the inside of the inner case 3 is basically a substitute for the potting material 5 of the first embodiment, the insulating oil filling the inside of the inner case 3 does not need to flow at such a sufficient flow speed that the insulating oil flows in the refrigerant flow passages 27.

The fifth embodiment has the advantage of eliminating the need for the filling step of the potting material 5 of the first embodiment.

Here, a lid member that covers the opening surface 24 of the inner case 3 and a frame-shaped cover that is similar to the cover 6 of the first embodiment and covers the upper end openings, located at an outer peripheral side of the opening surface 24, of the refrigerant flow passages 27 could be individually provided.

The invention claimed is:

1. A capacitor comprising:
    a box-shaped inner case whose one side surface is an opening surface;
    an outer case enclosing outer sides of surfaces except the opening surface of the inner case, forming gaps that serve as refrigerant flow passages between the inner case and the outer case and provided with a refrigerant inlet and a refrigerant outlet;
    a capacitor element placed in the inner case through the opening surface, terminals of the capacitor element being arranged at the opening surface; and
    a thermal conductive potting material filling the inner case so that the capacitor element except the terminals is embedded.

2. The capacitor as claimed in claim 1, wherein
    the inner case and the outer case each have a rectangular parallelepiped box shape,
    one side surface, corresponding to the opening surface of the inner case, of the outer case is an opening surface, and the inner case can be installed in the outer case through the opening surface of the outer case, and the refrigerant inlet is provided at one end portion in a longitudinal direction of the outer case, and the refrigerant outlet is provided at the other end portion of the outer case.

3. The capacitor as claimed in claim 2, further comprising:
a frame-shaped cover fixed to the one side surface, serving as the opening surface, of the outer case and covering a gap between the opening surface of the outer case and the inner case.

4. The capacitor as claimed in claim 1, wherein
a cooling fin is provided at least at a part of outside surfaces, which are in contact with the refrigerant flow passages, of the inner case.

5. The capacitor as claimed in claim 1, wherein
a refrigerant is cooling water or insulating oil.

6. The capacitor as claimed in claim 1, wherein
another electronic component is attached to an outside surface of the outer case.

7. The capacitor as claimed in claim 1, wherein
a discharge resistor connected to the capacitor element is placed in the inner case together with the capacitor element.

8. A capacitor comprising:
a box-shaped inner case whose one side surface is an opening surface and which is filled with insulating oil serving as a refrigerant and has a communication hole through which the insulating oil can flow;

an outer case enclosing outer sides of surfaces except the opening surface of the inner case, forming gaps that serve as refrigerant flow passages between the inner case and the outer case and provided with a refrigerant inlet and a refrigerant outlet;

a capacitor element placed in the inner case through the opening surface, terminals of the capacitor element being arranged at the opening surface; and a lid member covering the opening surface with the terminals being led out.

9. The capacitor as claimed in claim 8, wherein
another electronic component is attached to an outside surface of the outer case.

10. The capacitor as claimed in claim 8, wherein
a discharge resistor connected to the capacitor element is placed in the inner case together with the capacitor element.

* * * * *